United States Patent [19]

Nomura

[11] Patent Number: 5,099,419
[45] Date of Patent: Mar. 24, 1992

[54] PIPELINE MICROCOMPUTER HAVING BRANCH INSTRUCTION DETECTOR AND BUS CONTROLLER FOR PRODUCING AND CARRYING BRANCH DESTINATION ADDRESS PRIOR TO INSTRUCTION EXECUTION

[75] Inventor: Masahiro Nomura, Tokyo, Japan

[73] Assignee: NEC Corporation, Tokyo, Japan

[21] Appl. No.: 441,142

[22] Filed: Nov. 27, 1989

[30] Foreign Application Priority Data

Nov. 25, 1988 [JP] Japan .................. 63-298513

[51] Int. Cl.[5] ............... G06F 9/32; G06F 9/30; G06F 9/38
[52] U.S. Cl. ............... 395/375; 364/231.8; 364/240.5; 364/261.3; 364/DIG. 1; 364/964.26; 364/926.91; 364/938; 364/DIG. 2
[58] Field of Search ... 364/200 MS File, 900 MS File

[56] References Cited

U.S. PATENT DOCUMENTS

| 3,881,173 | 4/1975 | Larsen et al. | 364/200 |
| 3,940,741 | 2/1976 | Horikoshi et al. | 364/200 |
| 4,200,927 | 4/1980 | Hughes et al. | 364/200 |
| 4,373,180 | 2/1983 | Linde | 364/200 |
| 4,604,691 | 8/1986 | Akagi | 364/200 |
| 4,719,570 | 1/1988 | Kawabe | 364/200 |
| 4,764,861 | 8/1988 | Shibuya | 364/200 |
| 4,827,402 | 5/1989 | Wada | 364/200 |
| 4,853,840 | 8/1989 | Shibuya | 364/200 |
| 4,860,197 | 8/1989 | Langendorf et al. | 364/200 |
| 4,881,170 | 11/1989 | Morisada | 364/200 |
| 4,924,377 | 5/1990 | Kuriyama et al. | 364/200 |
| 4,954,947 | 7/1990 | Kuriyama et al. | 364/200 |

Primary Examiner—Thomas C. Lee
Assistant Examiner—Krisna Lim
Attorney, Agent, or Firm—Foley & Lardner

[57] ABSTRACT

In a microcomputer for use in combination with a memory which memorizes a sequence of instruction codes including branch instruction codes and ordinary instruction codes, each instruction is prefetched from the memory to a bus controller and monitored by a branch destination address calculator to detect whether or not each instruction code specifies the branch instruction code to calculate a branch destination address indicated by the branch destination address. Such calculation of the branch destination address is carried out before the branch instruction code is fed to an execution unit through an instruction code memory and executed by the execution unit indepenently of prefetch operation in the bus controller. The branch destination address calculator comprises a branch instruction detection circuit for detecting a branch instruction code and an address calculation circuit for calculating the branch destination address when the branch instruction code by the branch instruction detection circuit.

3 Claims, 7 Drawing Sheets

PIPELINE MICROCOMPUTER HAVING BRANCH INSTRUCTION DETECTOR AND BUS CONTROLLER FOR PRODUCING AND CARRYING BRANCH DESTINATION ADDRESS PRIOR TO INSTRUCTION EXECUTION

BACKGROUND OF THE INVENTION

This invention relates to a microcomputer for use in combination with a memory to process a sequence of instruction codes in a pipeline fashion. Although a sequence of data signals can be also processed in such a microcomputer, description will be mainly made about processing the instruction codes hereinunder because this invention is not directly concerned with processing the data signals.

In a conventional microcomputer of the type described, a bus control unit is coupled to a memory through a bus to access the memory and to thereby carry out a write-in or a readout operation of the instruction codes between the memory and the bus control unit. During the readout operation, each instruction code is successively sent from the bus control unit to an instruction code memorizing circuit to be memorized in the instruction code memorizing circuit and to be read as a readout instruction code. The readout instruction code is delivered as an execution instruction code from the instruction code memorizing circuit to an execution unit and is executed by the execution unit.

With this structure, each readout instruction code is read out of the memory during the readout operation to be sent from the bus control unit to the instruction code memorizing circuit as the execution instruction code prior to execution of the execution unit. Thus, each readout instruction code is prefetched from the memory to the bus control unit before execution of each readout instruction code. Under the circumstances, each execution instruction code is executed by the execution unit in a pipeline fashion independently of the readout and the write-in operations carried out in the bus control unit.

Herein, it is to be noted that the instruction codes specify either branch instruction codes or the other instruction codes which may be called ordinary instruction codes, such as data transfer instruction codes, arithmetic calculation instruction codes, etc. In addition, the branch instruction code is classified into a conditional branch instruction code and an unconditional branch instruction code.

When such a branch instruction code is required from the execution unit in the conventional microcomputer with a previously prefetched instruction code memorized in the instruction code memorizing circuit, such a previously prefetched instruction code should be rendered invalid or cancelled in the instruction code memorizing circuit. Thereafter, the branch instruction code must be read out of the memory and sent from the bus control unit to the execution unit through the instruction code memorizing circuit.

This shows that the occurrence of the branch instruction causes a disturbance of pipeline control and hinders high speed execution of the instructions.

SUMMARY OF THE INVENTION

It is an object of this invention to provide a microcomputer which is capable of executing a branch instruction code also at a high speed.

It is another object of this invention to provide a microcomputer of the type described, which is capable of avoiding the disturbance of pipeline control.

A microcomputer to which this invention is applicable is for use in combination with a memory which memorizes a sequence of instruction codes and a sequence of data signals. The instruction codes comprise ordinary instructions and branch instructions. The microcomputer comprises bus control means coupled to said memory for accessing the memory to selectively control a write-in operation and a readout operation of the memory and to thereby write and read each of the instruction codes and the data signals into and out of the memory, respectively, instruction code memorizing means coupled to the bus control means for successively memorizing a readout instruction code read out of the memory during the readout operation through the bus control means to produce the readout instruction code memorized therein as an execution instruction code, and instruction execution means successively supplied with the execution instruction code for executing the execution instruction code independently of the write-in and the readout operations of the memory. The microcomputer comprises branch instruction detecting means supplied with the readout instruction code for detecting whether or not the readout instruction code specifies one of the branch instructions to produce a branch instruction detection signal on detecting that the readout instruction code specifies the branch instruction, address calculation means supplied with the readout instruction code for calculating, from the readout instruction code, a branch destination address of the memory, and means for supplying the branch destination address to the bus control means. The bus control means is for carrying out the readout operation of the branch instruction from the branch destination address prior to execution of the branch instruction in the instruction execution means.

DESCRIPTION OF THE PREFERRED EMBODIMENTS

Figure 1:
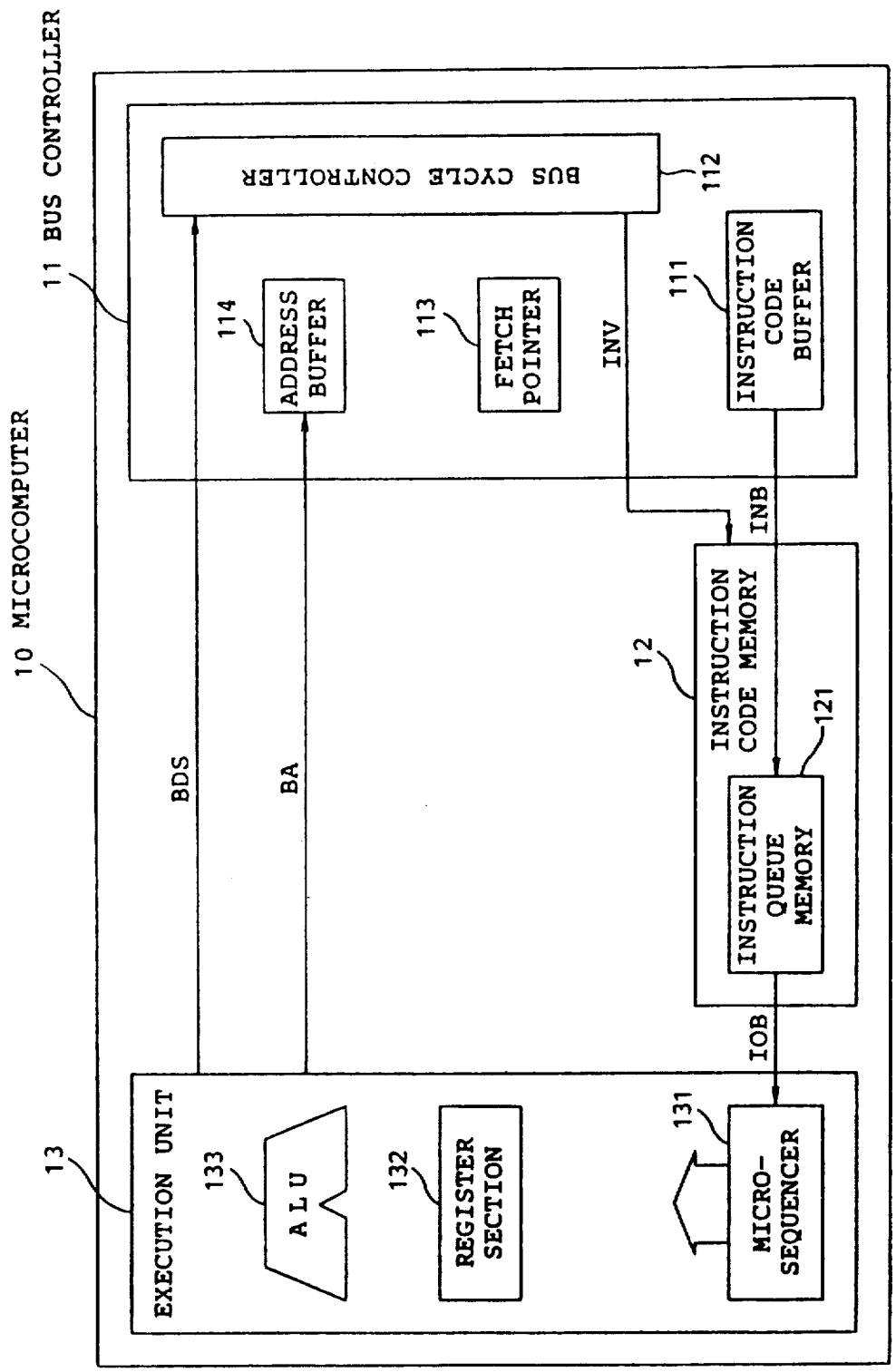
FIG. 1 is a block diagram of a conventional microcomputer which can process a branch instruction code.

Referring to FIG. 1, a conventional microcomputer (depicted at 10) will be described at first for a better understanding of this invention. The microcomputer 10 is for use in combination with a memory unit (not shown) for memorizing a sequence of instruction codes in addition to a sequence of data signals which will not be described hereinunder. The instruction codes are classified into branch instruction codes and the other or ordinary instruction codes, as mentioned in the preamble of the instant specification. In addition, the branch instruction codes are further classified into conditional branch code instructions and unconditional branch codes.

The illustrated microcomputer 10 comprises a bus control unit 11 which is connected to a bus (not shown) and which accesses the memory unit to read and write each instruction code and each data signal out of and into the memory unit. Thus, the bus control unit 11 selectively controls a write-in operation and a readout operation of the memory unit. Each instruction code is prefetched from the memory into the bus control unit 11 through the bus to be stored into an instruction code buffer 111 of the bus control unit 11 and to be sent as a readout instruction code from the instruction code buffer 111 to an instruction code memory 12. Thereafter, the readout instruction code is successively delivered as an execution instruction code from the instruction code memory 12 to an execution unit 13. The execution unit 13 successively executes each execution instruction code. Such execution of each execution instruction code can be carried out in a pipeline fashion independently of the readout and the write-in operations of the memory unit.

More specifically, the bus control unit 11 comprises a bus cycle controller 112 for starting a bus cycle so as to fetch each instruction code from the memory, a fetch pointer 113 for indicating an address from which an instruction is to be prefetched, and an address buffer 114 for memorizing a branch destination address calculated by the execution unit 13. On the other hand, the illustrated instruction code memory 12 is specified by an instruction queue memory 121 for successively memorizing each readout instruction code to supply the execution instruction code to the execution unit 13 through an instruction output bus IOB. In addition, the execution unit 13 is specified only by a microsequencer 131, a register section 132, and an arithmetic logic unit (ALU) 133.

In this microcomputer, the bus cycle controller 112 monitors status of the instruction queue memory 121 with an address kept in the fetch pointer 113. If the instruction queue memory 121 has an empty portion, an instruction code is fetched from the address of the memory unit indicated by the fetch pointer 113 under control of the bus cycle controller 112 and is temporarily memorized as the readout instruction code in the queue memory 121. Thereafter, the readout instruction code is successively read out of the instruction queue memory 121 to be sent to the microsequencer 131 as the execution instruction code through the instruction output bus IOB.

The execution unit 13 successively executes each execution instruction read out of the instruction queue memory 121.

Figure 2:
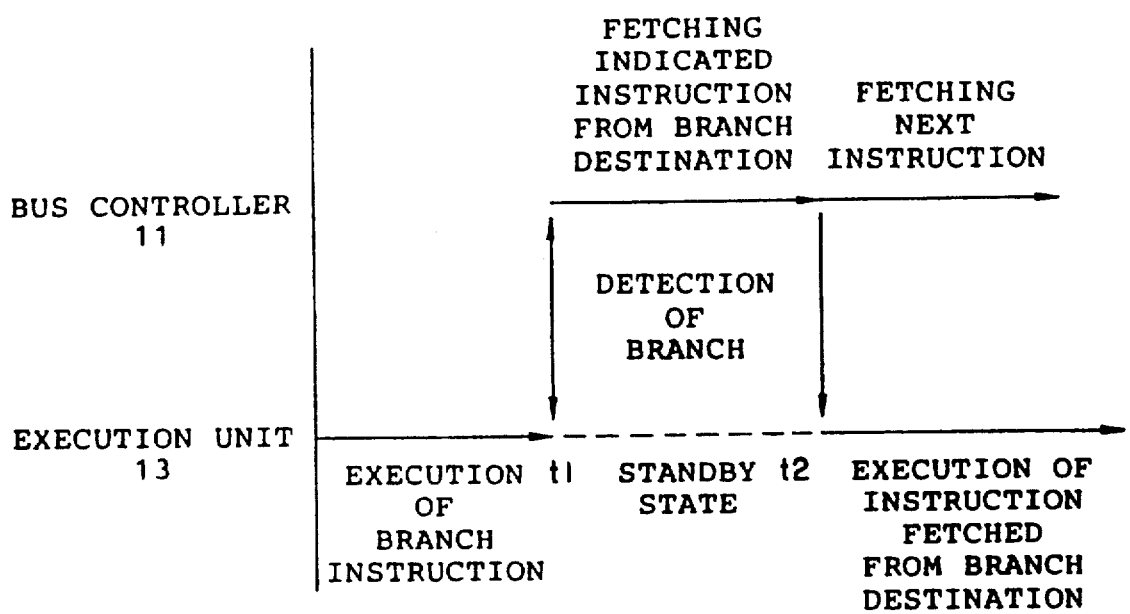
FIG. 2 is a time chart for use in describing operation of the conventional microcomputer.

Referring to FIG. 2 together with FIG. 1, let a branch instruction be executed by the execution unit 13, as shown at a first time instant t1. When judgement is made about branching an instruction as a result of execution of such a branch instruction, the execution unit 13 supplies a branch detection signal BDS and a branch address BA to the bus cycle controller 112 and the address buffer 114 of the bus controller 11, respectively. The branch address is indicative of a branch destination address.

On occurrence of the branch detection signal BDS, instruction codes which are previously fetched in the instruction queue memory 121 should be rendered invalid. To this end, the bus cycle controller 112 supplies the instruction code memory 12 with an invalidity signal INV indicative of invalidity of the instruction codes previously fetched in the instruction queue memory 121. In addition, the bus cycle controller 112 starts a bus cycle for branching an instruction to renew contents of the fetch pointer 113. Furthermore, the instruction code buffer 111 is loaded with an indicated instruction read out of the branch destination address, as shown in FIG. 2. Subsequently, the indicated instruction is transferred as a readout instruction from the instruction code buffer 111 to the instruction queue memory 121 through an instruction code input bus INB, as shown at a second time instant t2 illustrated in FIG. 2.

The indicated instruction read out of the branch destination address is stored into the instruction queue memory 121 as the readout instruction code after the previously fetched instruction codes are cleared in the instruction queue memory 121 in response to the invalidity signal INV. Thereafter, the readout instruction code is successively read out of the instruction queue memory 121 in a first-in-first-out fashion.

With this structure, the execution unit 13 must be put into a standby state after production of the branch detection signal BDS until the indicated instruction code is stored in the instruction queue memory 121, as depicted at a broken line in FIG. 2. After such a standby state, the execution unit 13 should process the indicated instruction code. Therefore, it takes a long time to execute an instruction with the conventional microcomputer when a branch instruction code appears, as pointed out in the preamble of the instant specification.

Figure 3:
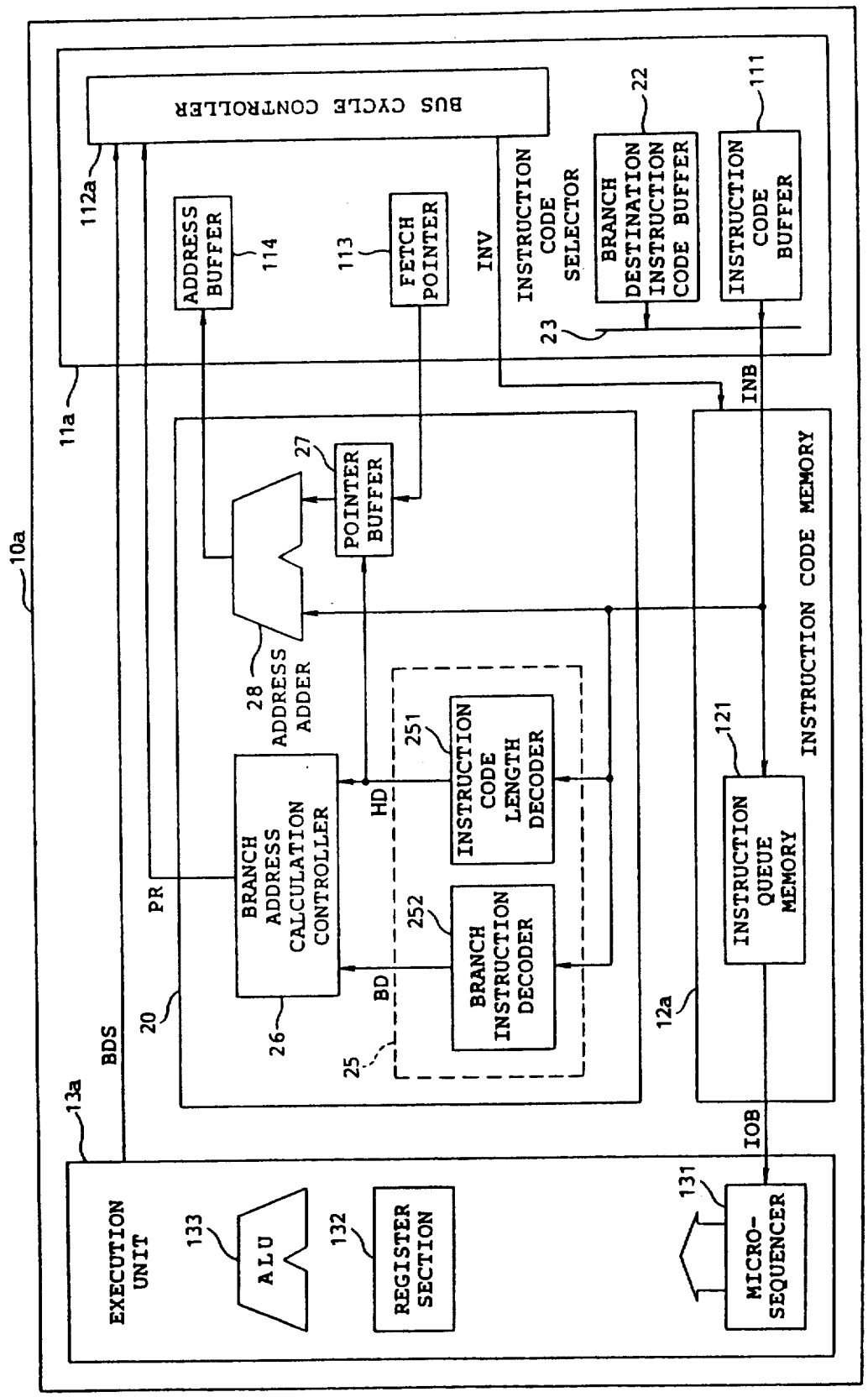
FIG. 3 is a block diagram of a microcomputer according to a first embodiment of this invention.

Referring to FIG. 3, a microcomputer 10a according to a first embodiment of this invention comprises a bus controller, an instruction code memory, and an execution unit which are similar in operation to those illustrated in FIG. 1 and which are therefore depicted at 11a, 12a, and 13a, respectively. In FIG. 3, it is to be noted here that the illustrated microcomputer 10a further comprises a branch destination address calculator 20 which detects an unconditional branch instruction code to calculate a branch address sent to the bus controller 11a. For this purpose, the illustrated bus controller 11a comprises a branch destination instruction code buffer 22 for storing an indicated instruction code which is prefetched from a branch destination address. The branch destination instruction code buffer 22 is connected to an instruction code selector 23 together with the instruction code buffer 111. In this connection, the bus cycle controller 112a starts a bus cycle so as to prefetch each instruction code from either the branch destination address or another ordinary instruction address. The bus controller 111 further comprises a fetch pointer 113 for indicating an address from which an instruction code is to be fetched and an address buffer 114 for storing a branch destination address calculated by the branch destination address calculator 20 in the manner discussed below.

The illustrated instruction code memory 12a is similar to that illustrated in FIG. 1 and supplied with either an ordinary instruction code or a branch instruction code as the readout instruction code from the instruction code selector 23 through the instruction code input bus INB. At any rate, the readout instruction code is successively stored in the instruction queue memory 121 and is successively read out of the instruction queue memory 121 as the execution instruction in a first-in-first-out fashion.

As in FIG. 1, a microsequencer 131, a register section 132, and an arithmetic logic unit 133 are included in the execution unit 13a illustrated in FIG. 3 so as to process each execution instruction sent from the instruction queue memory 121 in the manner described in reference to FIG. 1.

In FIG. 3, the branch destination address calculator 20 comprises a branch instruction code detection circuit 25 which is connected to the bus controller 11a through the instruction input code bus INB and which is successively supplied with the readout instruction code. The illustrated instruction code detection circuit 25 always monitors the readout instruction code sent on the instruction code input bus INB and comprises an instruction code length decoder 251 for detecting an instruction code length of the readout instruction code to produce an instruction head detection signal HD representative of a head or leading portion of a following instruction. Specifically, the instruction code length decoder 251 interprets an instruction code length of the readout instruction code and calculates the head or leading position of the following instruction. The instruction head detection signal HD is supplied to a branch address calculation controller 26 and a pointer buffer 27 connected to the fetch pointer 113 of the bus controller 11a. The instruction head detection signal HD is produced at a time instant at which a leading instruction code of the following instruction is transferred from the instruction code selector 23 to the instruction queue memory 121. Supplied with the instruction head detection signal HD, contents of the fetch pointer 113 are latched into the pointer buffer 27.

In addition, the instruction code detection circuit 25 further comprises a branch instruction decoder 252 for detecting whether or not the readout instruction code specifies an unconditional branch instruction to produce a branch instruction detection signal BD on detection of the unconditional branch instruction. The unconditional branch instruction is detected by monitoring an instruction code pattern of the unconditional branch instruction. The branch instruction detection signal BD is sent from the branch instruction decoder 252 to the branch address calculation circuit 26 together with the instruction head detection signal HD.

Supplied with the instruction head detection signal HD and the branch instruction detection signal BD, the branch address calculation controller 26 supplies the bus cycle controller 112a with a prefetch request signal PR which indicates a prefetch operation of a branch destination instruction code. Simultaneously, an address adder 28 is supplied with a displacement derived from the readout instruction and the contents of the pointer buffer 27 to produce a branch destination address of the unconditional branch instruction decoded by the branch instruction decoder 252. The branch destination address is sent to the address buffer 114. In this way, the branch destination address is sent to the bus controller 11a together with the prefetch request signal PR.

Responsive to the prefetch request signal PR, the bus cycle controller 112a starts a bus cycle for prefetching the branch destination instruction code. In this case, the branch destination instruction code is read out of the destination address of the memory pointed by the address buffer 114. The branch destination instruction code read out of the memory is stored in the branch destination instruction code buffer 22.

The execution unit 13a successively reads the execution instruction out of the instruction queue memory 121 to execute the same in the manner described in conjunction with FIG. 1. It is assumed that the execution unit 13a executes an unconditional branch instruction which is already detected by the branch address calculation controller 26 and that judgement is made about branching an instruction by the execution unit 13a. As a result, the branch detection signal BDS is sent from the execution unit 139 to the bus cycle controller 112a.

Responsive to the branch detection signal BDS, the bus cycle controller 11a delivers the invalidity signal INV to the instruction code memory 12a so as to make instruction codes prefetched in the instruction queue memory 121 invalid. On the other hand, the instruction code selector 23 is controlled by the bus cycle controller 112a to transfer a branch destination instruction code from the branch destination instruction code buffer 22 to the instruction queue memory 121. Thereafter, contents of the fetch pointer 113 are renewed to start a following bus cycle of fetching a following instruction code from a next address which follows the prefetched branch destination instruction code. The following instruction code is sent to the instruction queue memory 121.

In the instruction queue memory 121, the prefetched instruction codes are rendered invalid. Thereafter, the branch destination instruction code is transferred from the bus controller 11a to the instruction queue memory 121 and is stored in the instruction queue memory 121.

Figure 4:
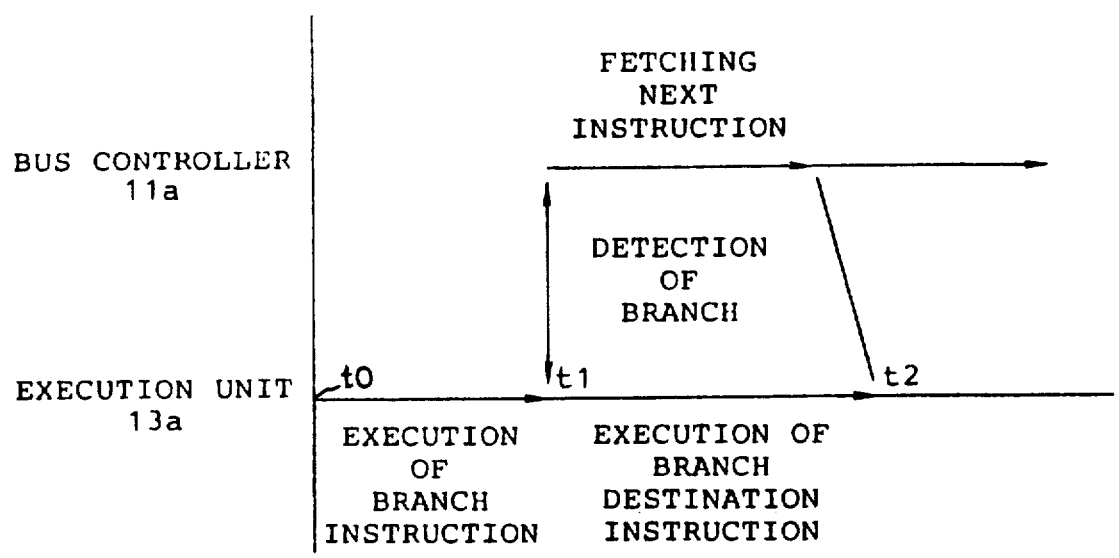
FIG. 4 is a time chart for use in describing operation of the microcomputer illustrated in FIG. 3.

Referring to FIG. 4 together with FIG. 3, the execution unit 13a is assumed to execute a branch instruction during a time interval between time instants t0 and t1. At the time instant t1, a branch or jump is indicated by the execution unit 13a to fetch a branch destination instruction code from a branch destination address. However, the branch destination instruction code in question is already memorized in the instruction queue memory 121. Therefore, the branch destination instruction code can be quickly executed between the time instant t1 and another time instant t2 by the execution unit 13a, as shown in FIG. 4. During the execution of the branch destination instruction, the bus controller 11a can fetch a next instruction following the branch destination instruction, as illustrated in FIG. 4. Thus, the next instruction can be quickly executed by the execution unit 13a after the time instant t2.

Figure 5:
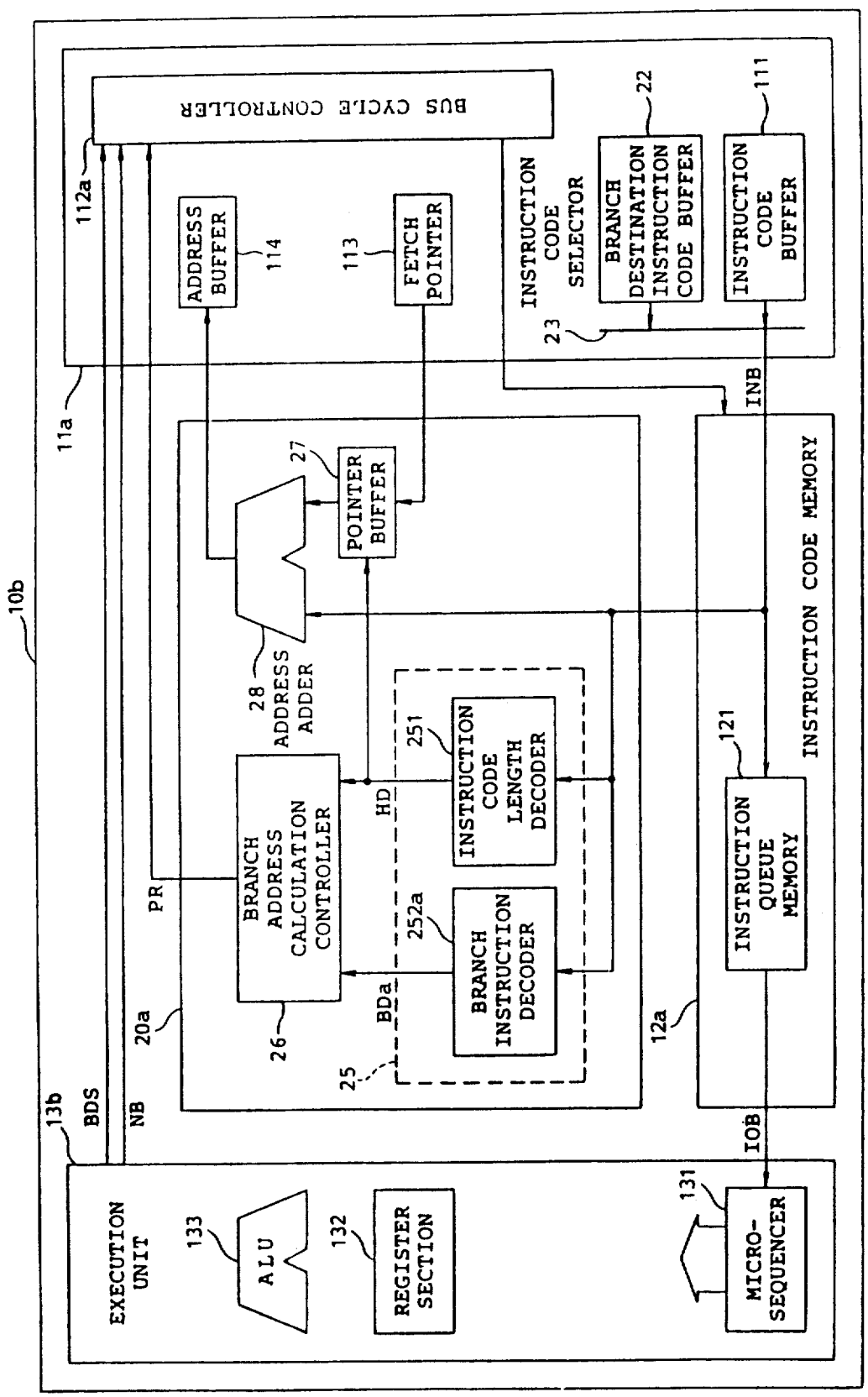
FIG. 5 is a block diagram of a microcomputer according to a second embodiment of this invention.

Referring to FIG. 5, a microcomputer 10b according to a second embodiment of this invention is similar to that illustrated in FIG. 3 except that a conditional branch instruction can be distinguished from an unconditional branch instruction by a branch instruction decoder 252a of a branch destination address calculator 20a illustrated in FIG. 5 and that an execution unit 13b illustrated in FIG. 5 produces an additional detection signal NB representative of detection of an unbranch instruction code together with the branch detection signal BDS representative of occurrence of either the unconditional branch instruction or the conditional branch instruction. The additional detection signal NB may be called an unbranch detection signal. Taking this into consideration, the illustrated branch instruction decoder 252a supplies the branch address calculation circuit 26 with a branch instruction detection signal representative of either the conditional or the unconditional branch instruction.

When the branch detection signal BDS is supplied to the bus cycle controller 112a, operation is carried out in the microcomputer 10b in the manner illustrated in conjunction with FIG. 3. On the other hand, when the unbranch detection signal NB is supplied to the bus cycle controller 112a, contents of the branch destination code buffer 22 is rendered invalid. Therefore, the fetch pointer 113 is not renewed. The other operations are similar to those illustrated in FIG. 3 and will, therefore, be described.

Figure 6:
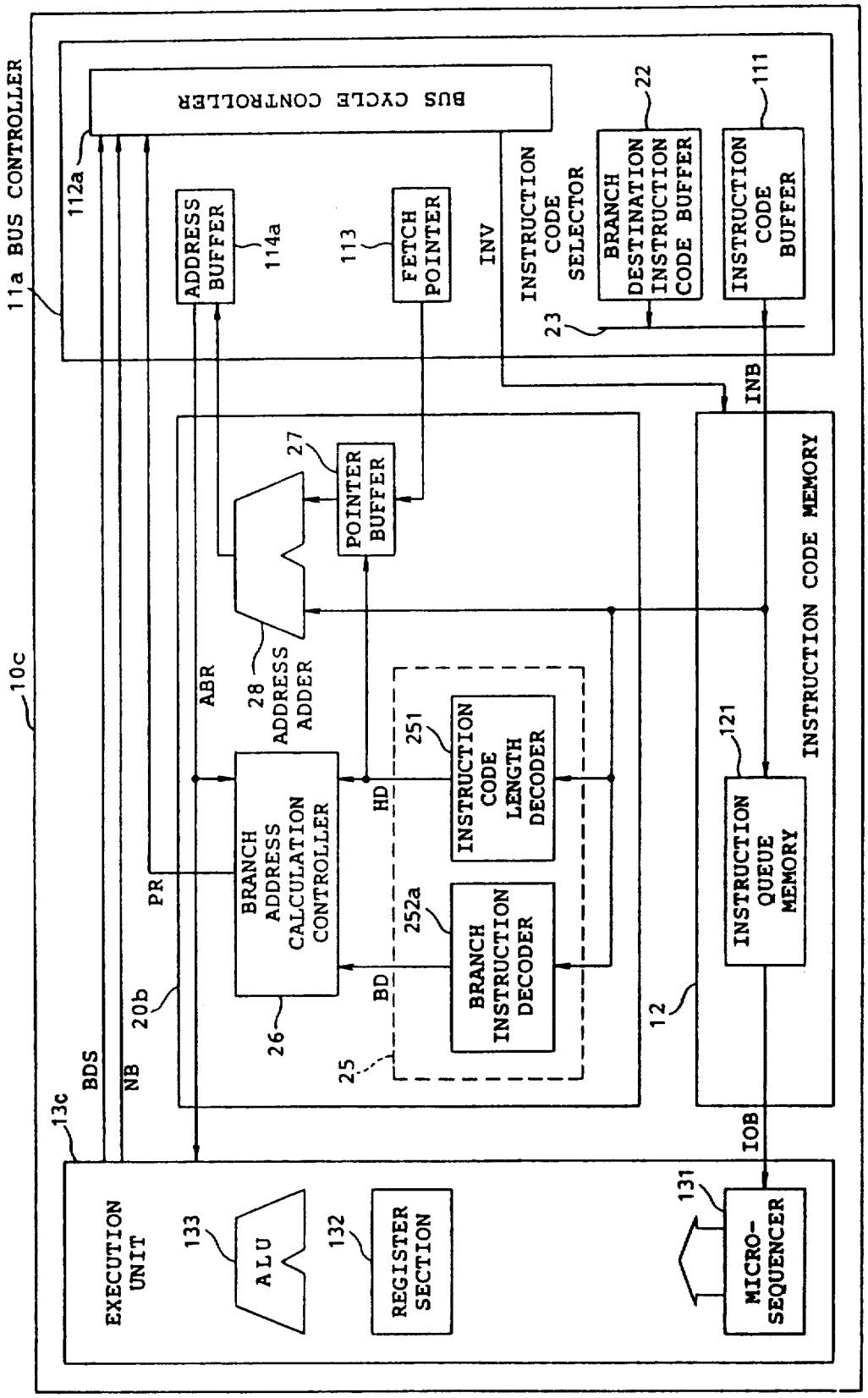
FIG. 6 is a block diagram of a microcomputer according to a third embodiment of this invention.

Referring to FIG. 6, a microcomputer 10c according to a third embodiment of this invention is similar to that illustrated in FIG. 3 except that an address buffer 114a is connected to the address adder 28 and a branch address calculation circuit 26 of the bus controller 11a and to an execution unit 13c. The address buffer 114a is used in common to both storage of a branch destination address sent from the branch destination address calculator 20b and storage of a data address appearing on request of a data read/write request sent from the execution unit 13c. In addition, an address buffer ready signal ABR is also sent from the address buffer 114a to the branch address calculation circuit 26 and the execution unit 13c so as to indicate allowance/inhibition of a write-in operation into the address buffer 114a. Both the branch destination address calculator 20b and the execution unit 13c checks a state of the address buffer ready signal ABR to write an address into the address buffer 114a, if the address buffer ready signal ABR is indicative of a writable state.

Operation of the microcomputer 10c is similar to that illustrated with reference to FIG. 5 except for operation concerned with the address buffer 114a. Therefore, description will be directed only to the address buffer 114a, the branch destination address calculator 20b, and the execution unit 13c. In this event, it is assumed that the branch instruction decoder 252a judges whether the readout instruction code specifies either an unconditional branch instruction or a conditional branch instruction, like in FIG. 5. Therefore, the address adder 28 is given an address of the pointer buffer 27 at which a detected unconditional or conditional branch instruction is located and a displacement value included in the unconditional branch instruction or the conditional branch instruction code. The address adder 28 adds the address of the pointer buffer 27 to the displacement value to calculate a branch destination address.

Supplied with the instruction head detection signal HD and the branch instruction detection signal BD, the branch address calculation controller 26 checks whether or not the address buffer ready signal ABR is representative of the writable state of the address buffer 114a. Furthermore, the branch address calculation controller 26 supplies the branch destination instruction code prefetch request signal PR to the bus controller 11a.

When the address buffer 114a is put into the writable state, the branch destination address is written into the address buffer 114a together with the branch destination instruction code prefetch request signal PR. Otherwise, the address buffer ready signal ABR is repeatedly checked and put into a standby state until the address buffer 114a is rendered into the writable state.

Supplied with the branch destination instruction code prefetch request signal PR, the bus cycle controller 112 starts the bus cycle for prefetching the branch destination instruction code indicated by the address buffer 114a. As a result, the instruction code in question is read out of the branch destination address and is stored into the branch destination code buffer 22.

Any other operations are similar to those illustrated in FIG. 5 and will therefore not be described any longer.

Figure 7:
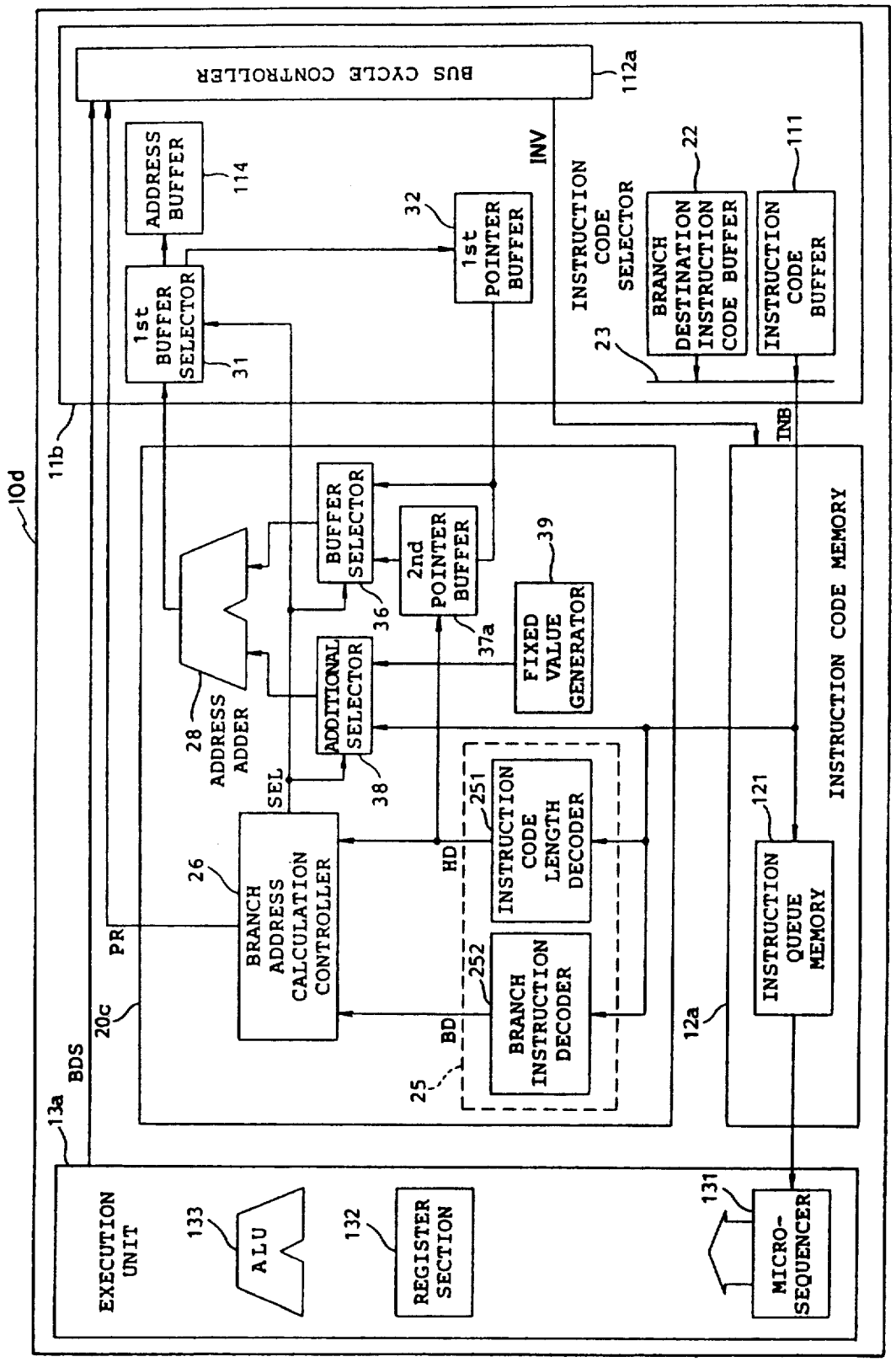
FIG. 7 is a block diagram of a microcomputer according to a fourth embodiment of this invention.

Referring to FIG. 7, a microcomputer 10d according to a fourth embodiment of this invention is similar in structure and operation to that illustrated in FIG. 3 except that a bus controller 11b and a branch destination address calculator 20c are somewhat different from those illustrated in FIG. 3, respectively. This shows that the illustrated microcomputer 10d comprises an instruction code memory 12a and an execution unit 13a similar to those illustrated in FIG. 3, respectively. In FIG. 7, the address buffer 114 is connected to the branch destination address calculator 20c through a buffer selector 31 which is connected to a first pointer buffer 32. The buffer selector 31 and the first pointer buffer 32 are operated in a manner to be described later.

On the other hand, the illustrated branch destination address calculator 20c includes a second pointer buffer 37a which is similar to the pointer buffer 27 shown in FIG. 3 and which is connected to a first pointer buffer 32. The second pointer buffer 37a is loaded with contents of the pointer buffer 32 in timed relation to an output signal of the instruction code length decoder 251 and is connected to a buffer selector 36 together with the first pointer buffer 32. The buffer selector 36 supplies a first selected signal to the address adder 28. An additional selector 38 is connected to the instruction code input bus INB and a fixed value generator 39 to select either the readout instruction code on the instruction code input bus INB or a fixed value produced by the fixed value generator 39 as a second selected signal. The second selected signal is delivered from the additional selector 38 to the address adder 28.

The buffer selector 36 and the additional selector 38 are controlled by a selection signal SEL sent from a branch address calculation controller 26. The selection signal SEL is also delivered to the buffer selector 31 of the bus controller 11b.

Now, it is assumed that the branch instruction decoder 252 detects an unconditional branch instruction code and that the selection signal SEL takes a logic "0" level or is inactive, the additional selector 38 selects the fixed value as the second selected signal while the first and the second buffer selectors 31 and 36 select the pointer buffer 32. The illustrated branch address calculation controller 26 makes the address adder 28 add the fixed value to an output signal of the first pointer buffer 32 because the fixed value and the output signal of the first pointer buffer 32 are selected by the additional selector 38. A result of the addition is sent to the first pointer buffer 32 through the first buffer selector 31 again is synchronism with a fetch operation of the bus cycle controller 112a. Similar operation is repeated as long as the selection signal is inactive. Thus, the pointer buffer 32 is loaded with a next following address of a following instruction to be fetched.

When both the instruction head detection signal HD and the branch instruction detection signal BD are active, the selection signal SEL becomes active, namely, takes a logic "1" level. Supplied with the selection signal SEL of the logic "1" level, the additional selector 38 selects a displacement value included in an instruction code of an unconditional branch instruction which is sent as the readout instruction code on the instruction code input bus INB. On the other hand, the buffer selector 36 selects the second pointer buffer 27a in which a detected unconditional branch instruction is memorized while the first buffer selector 31 selects the address buffer 114. In this event, the address adder 28 adds a value of the second pointer buffer 36 and the displacement value of the detected unconditional branch instruction code to calculate a branch destination address indicated by the detected unconditional branch instruction code. The branch destination address is written into the address buffer 114 through the first buffer selector 31. In addition, the branch address calculation controller 26 renders the branch destination instruction code prefetch request signal PR active.

Responsive to the branch destination instruction code prefetch request signal PR, the bus cycle controller 112a starts a bus cycle for prefetching the branch destination instruction code and reads the same out of the destination address. The branch destination instruction code is stored in the branch destination instruction code buffer 22.

According to the illustrated microcomputer 10d, the first pointer buffer 32 is successively renewed. This shows that, when a branch destination instruction code is prefetched from a destination address, a next following instruction code is continuously fetched from a next address following the destination address and is sent to the instruction queue memory 121.

While this invention has thus far been described in conjunction with several embodiments thereof, it will readily be possible for those skilled in the art to put this invention into practice in various other manners.

What is claimed is:

1. A microcomputer for use in combination with a memory which memorizes a sequence of instruction codes and a sequence of data signals, said instruction codes comprising ordinary instructions and branch instructions, said microcomputer comprising:

(a) bus control means coupled to said memory for accessing said memory to selectively control a write-in operation and a readout operation of said memory and to thereby write and read each of the instruction codes and the data signals into and out of said memory as a write-in instruction code and a readout instruction code, respectively;

(b) instruction code memorizing means coupled to said bus control means for successively memorizing said readout instruction code read out of said memory through said bus control means to produce the readout instruction code memorized therein as an execution instruction code;

(c) instruction execution means successively supplied from said instruction code memorizing means with said execution instruction code for executing said execution instruction code in a pipeline fashion independently of said write-in and said readout operations carried out in said bus control means;

(d) branch instruction detecting means, supplied with said readout instruction code from said bus control means, for detecting whether or not said readout instruction code specifies said branch instruction to produce a branch destination instruction request signal on detection of said branch instruction before said branch instruction is executed in said instruction execution means in said pipeline fashion;

(e) address calculation means, supplied with said readout instruction code from said bus control means, for calculating a branch destination address of said memory from said readout instruction code;

(f) means for supplying said branch destination address and said branch destination instruction request signal to said bus control means; and (g) said bus control means being for carrying out said readout operation from said branch destination address prior to execution of said branch instruction in said instruction execution means.

2. A microcomputer as claimed in claim 1, said branch destination address being defined by a sum of a reference address of the readout instruction and a displacement derived from the readout instruction, wherein said address calculation means comprises:
   means for storing said reference address; and
   means for calculating said sum of the reference address and said displacement.

3. A microcomputer for use in combination with a memory which memorizes a sequence of instruction codes and a sequence of data signals, said instruction codes comprising ordinary instructions and branch instructions, said microcomputer comprising:

(a) bus control means coupled to said memory for accessing said memory to selectively control a write-in operation and a readout operation of said memory and to thereby write and read each of the instruction codes and the data signals into and out of said memory as a write-in instruction code and a readout instruction code, respectively;

(b) instruction code memorizing means, coupled to said bus control means, for successively memorizing said readout instruction code read out of said memory through said bus control means to produce the readout instruction code memorized therein as an execution instruction code;

(c) instruction execution means successively supplied from said instruction code memorizing means with said execution instruction code for executing said execution instruction code in a pipeline fashion independently of said write-in and said readout operations carried out in said bus control means;

(d) branch instruction detecting means, supplied with said readout instruction code from said bus control means, for detecting whether or not said readout instruction code specifies said branch instruction to produce a branch destination instruction request signal on detection of said branch instruction before the branch instruction is executed in said instruction execution means in said pipeline fashion;

(e) a pointer buffer for holding a reference address derived from said readout instruction code to produce a held reference address;

(f) a buffer selector for selecting either one of said reference address and said held reference address to produce a first selected address;

(g) a fixed value generator for generating a fixed value;

(h) an additional selector, responsive to said fixed value and said readout instruction code sent from said bus control means and coupled to said branch instruction detecting means, for selecting either one of said fixed value and a readout address derived from said readout instruction code as a second selected address;

(i) an address adder for summing up said first selected address and said second selected address to produce a sum address which specifies a branch destination address of said branch destination instruction code; and (j) means for supplying said sum address to said bus control means;

(k) said bus control means being for carrying out said readout operation from said sum address prior to execution of said branch instruction in said instruction execution means.

* * * * *